No. 842,953. PATENTED FEB. 5, 1907.
H. HELLMAN & L. C. BAYLES.
ROCK DRILL.
APPLICATION FILED AUG. 11, 1904.
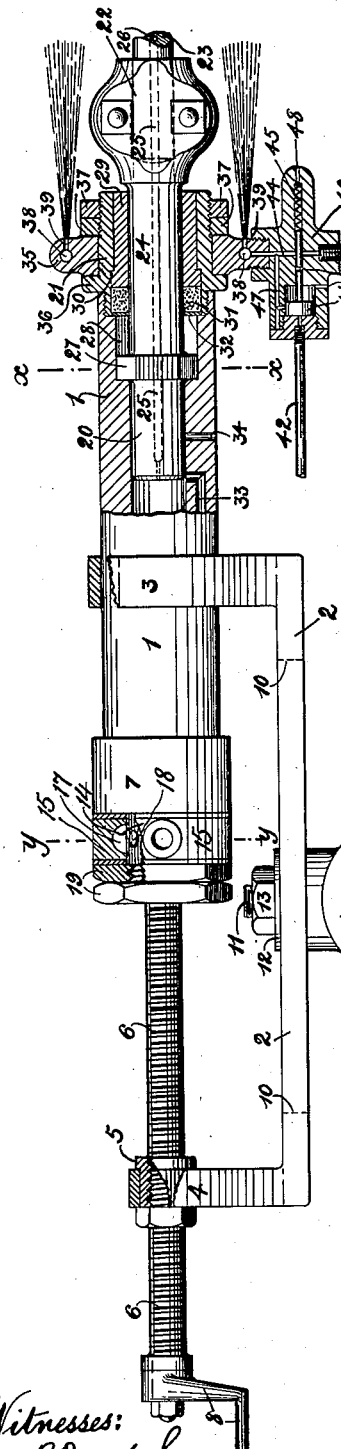
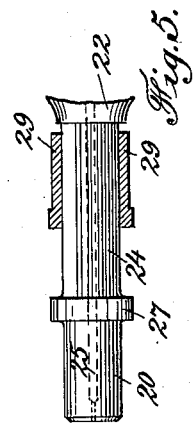
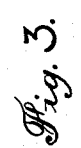
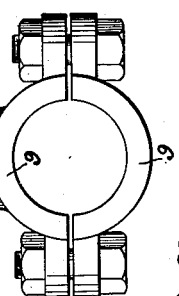
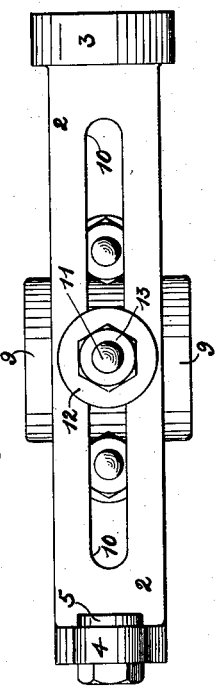
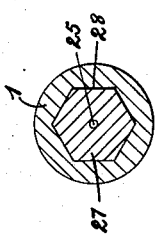
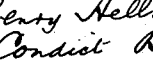

UNITED STATES PATENT OFFICE.

HENRY HELLMAN AND LEWIS CONDICT BAYLES, OF JOHANNESBURG, TRANSVAAL.

ROCK-DRILL.

No. 842,953.     Specification of Letters Patent.     Patented Feb. 5, 1907.

Application filed August 11, 1904. Serial No. 220,343.

*To all whom it may concern:*

Be it known that we, HENRY HELLMAN and LEWIS CONDICT BAYLES, citizens of the United States, residing at Johannesburg, Transvaal, have invented certain new and useful Improvements in Rock-Drills or Rock-Drilling Machines, of which the following is a specification.

This invention has reference to rock-drilling machines or engines, and relates especially to the combination of an improved shell or cradle with a power-cylinder, whereby the latter may be adjustably and slidably connected with a support.

We will now proceed to describe our invention in detail by aid of the accompanying sheet of illustrative drawings, in which—

Figure 1 shows a side elevation, partly in section, of the complete machine or engine; Fig. 2, a transverse section on line $xx$, Fig. 1; Fig. 3, a transverse section on line $yy$, Fig. 1; Fig. 4, a plan of the shell or cradle of the machine or engine detached. Fig. 5 is a view of the shank-piece 20, illustrating a modified means for insuring its rotation with the power-cylinder. Fig. 6 is an elevation of the ring or washer detached.

The several improvements to be hereinafter described may be utilized in the construction of a machine or engine designed to operate with a valve for controlling the admission of the actuating fluid alternately to either end of the power-cylinder or either side of the reciprocating percussive member, or to a machine or engine designed to operate without a valve, or to one in which said reciprocating percussive member controls the admission of said actuating fluid to the power-cylinder in which it reciprocates.

In the drawings we do not show the piston or any means for controlling the admission of the actuating fluid to either end of the power-cylinder, as these parts in themselves do not constitute any feature of the present invention and they may be of any suitable construction or arrangement.

The machine or engine proper consists of the power-cylinder 1, which is mounted in a shell or cradle in which it is capable of advancing or receding longitudinally of the axis of the cylinder 1.

The shell or cradle comprises the central member 2, which at the forward end is constructed to form the front guide 3 for the power-cylinder 1 and at the other end is constructed to form the rear guide 4. The front guide 3 is formed with a hole slightly larger in diameter than the external diameter of the power-cylinder 1, so that the power-cylinder may slide freely through the guide within certain limits in either direction. The rear guide 4 is constructed to form or, as shown in the drawings, is fitted with a detachable piece 5, which constitutes the feed-nut and is formed with an internal screw-thread corresponding in shape and pitch to the thread on the feed-screw which works through it. The feed-screw 6 at the forward end is attached to the rear end of the power-cylinder 1 or cylinder-cap 7 and, being supported in the feed-nut 5, serves as a guide and support for the rear end of the power-cylinder. The rear end of the feed-screw 6 is equipped with a crank 8 or other suitable device for rotating the feed-screw 6. It will be understood that by rotating the feed-screw 6 in one direction it works through the stationary feed-nut 5 and advances the power-cylinder 1 through the front guide 3 and that by rotating said screw in the opposite direction the cylinder 1 is moved in a rearward direction through the front guide 3.

To the central member 2 is attached a column-clamp 9, which may be of the ordinary or any other suitable construction. In the center piece 2 is formed a longitudinal slot 10, into which projects a screwed projection 11, formed on or fitted to the upper half of the column-clamp 9. Over the screwed portion 11 and above the slot 10 is arranged a washer 12, and over the end of said projection 11 is screwed a nut 13, which serves for rigidly securing the clamp 9 to the center member 2 of the shell or cradle. By this construction any desired longitudinal adjustment of the cradle may be effected by loosening the nut 13 and sliding the shell or cradle backward or forward in the slot 10 and by tightening the nut 13 after the cradle has been brought into the desired position. It will be perceived that this arrangement will permit the cradle, and with it the machine, to be bodily advanced, which under certain circumstances will render it unnecessary to dismount the machine and to remove the column-bar and reërect it nearer the rock-face and that in like manner it will allow of the machine being moved bodily in a rearward direction. This construction will allow of the machine being mounted on a column-bar located nearer to or farther from the rock-face than would be possible with the existing machines.

In place of the column-clamp shown in the drawings it will be evident that an ordinary cone or other device may be used and be adapted to be adjustable longitudinally of the shell or cradle.

The cylinder-cap 7, which in the case of a machine or engine provided with a valve for admitting the actuating fluid serves to inclose the valve-box and in the case of the valveless construction serves for closing the end of the cylinder, is formed with a rearward cylindrical extension 14, Figs. 1 and 3, in the rear end of which is screwed or otherwise fixed the feed-screw 6. On this extension 14 next the cap 7 is arranged a swivel or swivel-piece 15, which serves for conducting the actuating fluid to the power-cylinder 1. The extension 14 is formed with a longitudinal hole 16, (see Fig. 3,) and in the swivel 15 is formed an annular recess 17, which is placed in communication with the longitudinal hole 16 by means of the transverse holes 18. The actuating fluid passes from the recess 17 through the holes 18 into the longitudinal hole 16, whence it passes into the power-cylinder 1 to be alternately admitted to either side of the reciprocating piston.

On the screwed rear extremity of the extension 14 are screwed lock-nuts 19, which serve to keep the swivel 15 in position on said extension 14.

In a prior application filed by us, bearing Serial No. 210,519, filed May 31, 1904, we describe the employment of a "shank-cap" which is located in the forward end of the power-cylinder, which serves for receiving and transmitting the impacts of the reciprocating member to the drilling bit or tool. In the arrangement referred to the shank of the drill or bit is projected into the forward end of the power-cylinder and projects into or abuts the forward end of said shank-cap. According to the arrangement shown in the accompanying drawings the shank-piece 20 is extended through the front end or head 21 of the power-cylinder 1 and is constructed or shaped with any suitable form of chuck or drill-bit-holding device 22, in which the drill or bit 23 is secured in any suitable manner. The chuck 22 shown in the drawings is of the ordinary U-bolt type. The shank-piece 20, extension 24, and chuck 22 are formed with a longitudinal passage 25, which allows a quantity of the actuating fluid to pass through these parts in order to prevent the overheating of the same by the repeated impacts of the reciprocating percussive member on the inner end of the shank-piece 20 and also for conducting the actuating fluid to or in proximity to the cutting end of the drill or bit 23 to blow out or assist in the expulsion of the rock-cuttings from between the cutting edges of the drill or bit and the bottom of the hole. For this purpose the drill or bit 23 is formed with a longitudinal hole 26, along which the fluid flows to the cutting extremity thereof. The passage of the actuating fluid through the drill-bit 23 tends to prevent the overheating of the same and particularly the cutting extremity in the drilling of upwardly-inclined or dry holes and as a result considerably increases the durability of the steel.

In order to effect the synchronous rotation of the drill or bit 23 with the drill-cylinder 1, the part 27 of the shank-piece 20 may be of a suitable polygonal section. In the drawings (see Figs. 1 and 2) it is shown of hexagonal section, and the recess or counterbore 28 in the forward end of the cylinder 1 in which it reciprocates is made of corresponding shape. This allows the shank-piece 20 and chuck 22 to move bodily forward or rearward within certain limits, while compelling it to rotate in unison with the cylinder 1. The shank of the drill or bit 23 is secured in the chuck 22 in such a way that it is compelled to rotate with the chuck and is incapable of independent rotary movement therein. Instead of making the part 27 of the shank-piece 20 of polygonal section, as shown in Fig. 1, the front portion 24 of said piece may be made of polygonal section and the cap or front head 21 or a bushing 29 therein be made of corresponding polygonal section with the same object as shown in Fig. 5.

In the arrangement shown the front head 21 is screwed into the front end of the cylinder 1 and it is fitted with a bushing 29, which is retained in position in the front head 21 by forming on the bushing 29 an annular projection or shoulder 30, which fits into a recess or counterbore in the inner end of the front head 21. Arranged in the front head 21 at the rear of the bushing 29 is a resilient pad 31 and protecting ring or washer 32, which receive the concussion in the event of the shank-piece 20 being driven forward in the cylinder 1, owing to the drill or bit 23 not engaging or coming into contact with the rock-face or bottom of the hole being drilled.

The bushing 29 and protecting ring or washer 32, which fit round the extension 24 of the shank-piece 20 between the part 27 of polygonal section and the chuck 22, are made in halves or sections, and the front head 21 by screwing into the open end of the cylinder 1 secures them in position round said extension 24.

33 is the port along which the actuating fluid passes to the front end of the drill-cylinder 1, and 34 the escape-port, which by allowing any actuating fluid that leaks past the piston when it is overlapping the port 33 to escape so prevents the reversal of said piston. The piston takes up such a position in the drill-cylinder 1 when the shank-piece 20 is driven forward, owing to the drill or bit not striking the rock.

In the formation of upwardly-inclined and dry holes the dust which is created in the boring of the hole issues from the hole and escapes into the atmosphere in the workings. We are aware that drills have been designed to convey to and deliver a stream or jet of water at the bottom of the hole, and others have been designed to deliver a spray of water and air through the drill-bit to the bottom of the hole, also that separate and independent spraying devices have been employed to charge the atmosphere with moisture to throw down the particles of dust as they emanate from the holes.

We have designed an arrangement for providing and directing around the mouth of the hole a spray or sprays of water, and according to our present improvements the said arrangement is located on or attached to the front end of the drill in such a way that it forms a part of the machine and may be detached therefrom and is preferably so constructed that it is operated automatically when the drill starts and stopped when the drill is put out of operation. The device produces a spray or sprays and directs it or them around the mouth of the hole, and so saturates the particles of dust and causes them to settle. This feature of our invention, in conjunction with the arrangement hereinbefore described for expelling the rock-cuttings or pulverized rock from the hole, provides a simple and efficient means for preventing the impregnation of the atmosphere in the workings with the rock-dust, and so obviates the deleterious effects which such dust has on the health of the operators of such machines.

The arrangement for providing the sprays of liquid consists of a swivel-piece 35, which is arranged round the front end or head 21 and abuts an annular projection or flange 36, formed at the rear end of the front head 21. The forward end of the front head 21 is formed with an external screw-thread, over which are screwed the lock-nuts 37, which serve to keep the swivel 35 in position. The swivel 35 is constructed with an internal annular hole 38 and with four (more or less) preferably equidistant apertures 39, communicating with the annular hole 38 and formed at right-angles to said hole 38, so that the sprays issuing therefrom are directed around the mouth of the hole being drilled. The apertures 39 may be made to diverge in the direction of the rock-face or be inclined outward to cause the sprays to encompass a larger area of the rock-face. To the swivel 35 is attached a valve-box 40, which incloses the valve 41. Into the valve-box 40 are fixed two pipes 42 43. The one pipe 42 places the valve-box 40 in communication with a source of supply of compressed air or other gaseous fluid under pressure—as, for example, by placing it in communication with the actuating-fluid-supply pipe and preferably between the machine and the valve which serves for admitting the fluid to the machine, so that when the fluid is admitted to the machine it passes along the pipe 42 into the valve-box 40 at the rear of the valve 41. The other pipe 43, which serves for conducting the water or other liquid under pressure to the valve-box 40, communicates with a source of supply of water or other liquid. This pipe 43 communicates with the swivel 35 through the port or passage 44. When the valve 41 is operated or pushed forward by the actuating fluid or other gaseous fluid-pressure, it compresses the spring 45 and brings the annular groove or recess 46 into coincidence with the port or passage 44 and opens the latter port to the water-supply pipe 43. The water is then permitted to flow up the port or passage 44 and into the swivel 35. Another port 47, formed in the valve-box 40, and which is controlled by the valve 41, serves for admitting a small quantity of the compressed air or other gaseous fluid under pressure to the port 44, which air or fluid passes along and commingles with the water and enters the annular hole 38 in the swivel 35, whence it passes out through the apertures 39 in the form of a spray, and is directed around the mouth of the hole, as is clearly illustrated in Fig. 1 of the drawings. Escape-ports 48 49 are formed in the valve-box 40, through which any of the gaseous fluid or water or other liquid leaking past the piston or valve 41 may pass.

What we claim as our invention, and desire to protect by Letters Patent, is—

1. In a rock-drilling machine or engine, in combination, a shell or cradle provided with front and rear guides, means adjustable longitudinally of the shell or cradle for fixing it to a support, a power-cylinder slidably mounted in the front guide, means located at the rear end of said cylinder for introducing actuating fluid into said cylinder, a feed-nut carried by the rear guide, a feed-screw working through said nut and attached to the rear end of the cylinder and means for rotating said screw to traverse the cylinder longitudinally of the cradle.

2. In a rock-drilling machine or engine, in combination, a shell or cradle provided with front and rear guides, means for fixing it to a support, a power-cylinder slidably mounted in the front guide, means for introducing actuating fluid into said cylinder, a feed-nut carried by the rear guide, a feed-screw working through said nut and attached to the rear end of the cylinder and means for rotating said screw to traverse the cylinder longitudinally of the cradle.

3. In a rock-drilling machine or engine, in combination, a shell or cradle, means for adjustably mounting said shell or cradle on a support, a power-cylinder slidably supported in said shell or cradle, means for moving said power-cylinder longitudinally of the shell or cradle, means compelling the drill bit or tool to rotate in unison with the cylinder while permitting it to move longitudinally of said cylinder, and means for providing a spray or sprays of water and directing the same around the mouth of the hole, substantially as described.

4. In a rock-drilling machine or engine, in combination a shell or cradle, means for slidably mounting said shell or cradle on a support, a power-cylinder slidably supported in said shell or cradle, a screw fitting said shell or cradle and engaging the rear end of the power-cylinder for moving said cylinder longitudinally of said shell or cradle, and means compelling the bit or tool to rotate in unison with the cylinder while permitting it to move longitudinally of said cylinder.

5. In a rock-drilling machine or engine, in combination a shell or cradle provided with front and rear guides, means adjustable longitudinally of the shell or cradle for fixing it to a support, a power-cylinder slidably mounted in the shell or cradle, a swivel carried by the rear end of the cylinder for introducing actuating fluid thereinto, a feed-screw carried by the rear end of the shell or cradle and connected to the rear end of the cylinder near the swivel and means for rotating said screw to traverse the cylinder longitudinally of the cradle.

6. In a rock-drilling machine or engine, in combination a shell or cradle, means for slidably mounting said shell or cradle on a support, a power-cylinder slidably supported in said shell or cradle, means for moving said power-cylinder longitudinally of the shell or cradle, a drilling bit or tool, and non-rotatable connections between the bit or tool and the forward end of the power-cylinder, for compelling the bit or tool to rotate in unison while permitting it to move longitudinally of said cylinder.

In witness whereof we have hereunto set our hands in the presence of two subscribing witnesses.

HENRY HELLMAN.
LEWIS CONDICT BAYLES.

Witnesses:
CHAS. OVENDALE,
R. OVENDALE.